(12) United States Patent
Tanaka

(10) Patent No.: US 10,268,078 B2
(45) Date of Patent: Apr. 23, 2019

(54) LIQUID CRYSTAL DISPLAY

(71) Applicant: Sharp Kabushiki Kaisha, Osaka-shi, Osaka (JP)

(72) Inventor: Toshiyuki Tanaka, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 458 days.

(21) Appl. No.: 14/913,413

(22) PCT Filed: Aug. 8, 2014

(86) PCT No.: PCT/JP2014/071059
§ 371 (c)(1),
(2) Date: Feb. 22, 2016

(87) PCT Pub. No.: WO2015/025743
PCT Pub. Date: Feb. 26, 2015

(65) Prior Publication Data
US 2016/0202555 A1    Jul. 14, 2016

(30) Foreign Application Priority Data

Aug. 23, 2013 (JP) .................................. 2013-173212

(51) Int. Cl.
*G02F 1/1335* (2006.01)
*G02F 1/1343* (2006.01)
(Continued)

(52) U.S. Cl.
CPC ....... *G02F 1/133621* (2013.01); *G02B 5/201* (2013.01); *G02F 1/133514* (2013.01);
(Continued)

(58) Field of Classification Search
CPC ............................................... G02F 1/133514
See application file for complete search history.

(56) References Cited

U.S. PATENT DOCUMENTS 5,478,680 A * 12/1995 Hishiro ................. G03F 7/0007
430/270.1
2009/0002858 A1    1/2009 Okutsu et al.
(Continued)

FOREIGN PATENT DOCUMENTS

JP    2008-268739 A    11/2008
JP    2008-303331 A    12/2008
(Continued)

*Primary Examiner* — Kendrick Hsu
(74) *Attorney, Agent, or Firm* — Keating & Bennett, LLP

(57) ABSTRACT

A spectrum of light which is emitted from an illuminator (2) of a liquid crystal display device (100) has a peak in each of the wavelength ranges of 447 to 453 nm, 538 to 542 nm, 613 to 617 nm, 628 to 632 nm, and 648 to 652 nm. The peak wavelength and rising wavelength of the transmission spectrum of the red color filters are, respectively, not less than 600 nm; and not less than 568 nm and not more than 572 nm. At wavelengths of 400 nm, 420 nm and 580 nm, the transmission spectrum of the red color filters has transmittances of, respectively, 10 to 15%; 3 to 6%; and 25 to 30%. The wavelengths at which the transmission spectrum of the red color filters exhibits a transmittance of 50% are contained within a range of 583 to 587 nm. The peak wavelength of the transmission spectrum of the green color filters is not less than 500 nm and not more than 560 nm. At wavelengths of 480 nm and 580 nm, the transmission spectrum of the green color filters exhibits transmittances of, respectively, 45 to 55%; and 65 to 70%. The wavelengths at which the transmission spectrum of the green color filters exhibits a transmittance of 50% are contained within a range of 478 to 482 nm and a range of 590 to 600 nm. The peak wavelength of the transmission spectrum of the blue color filters is not less than 440 nm and not more than 470 nm. At wavelengths of 400 nm and 500 nm, the transmission spectrum of the blue color filters exhibits transmittances of, respectively, 25 to 40%; and 40 to 50%. The wavelengths at
(Continued)

which the transmission spectrum of the blue color filters exhibits a transmittance of 50% are contained within a range of 493 to 503 nm.

5 Claims, 13 Drawing Sheets

(51) Int. Cl.
*G02B 5/20* (2006.01)
*G02F 1/1333* (2006.01)
(52) U.S. Cl.
CPC .. *G02F 1/133603* (2013.01); *G02F 1/134363* (2013.01); *G02F 2001/133357* (2013.01); *G02F 2001/133614* (2013.01)

(56) References Cited

U.S. PATENT DOCUMENTS

| | | | |
|---|---|---|---|
| 2010/0091215 A1 | 4/2010 | Fukunaga et al. | |
| 2011/0043101 A1 | 2/2011 | Masuda et al. | |

FOREIGN PATENT DOCUMENTS

| | | |
|---|---|---|
| JP | 2009-036964 A | 2/2009 |
| JP | 2009-076836 A | 4/2009 |
| JP | 2009-192662 A | 8/2009 |
| JP | 2009-192664 A | 8/2009 |
| JP | 2009-271275 A | 11/2009 |
| JP | 2010-093132 A | 4/2010 |
| WO | 2007/102386 A1 | 9/2007 |
| WO | 2009/110285 A1 | 9/2009 |

\* cited by examiner (a)

(b)

LIQUID CRYSTAL DISPLAY

TECHNICAL FIELD

The present invention relates to a liquid crystal display device.

BACKGROUND ART

Currently, pseudo white LEDs (light-emitting diodes) are generally used as light sources for backlighting a liquid crystal display device. In a pseudo white LED, an LED which emits blue light and a yellow phosphor which emits yellow light by being excited by the blue light are used in combination, whereby white light emission is achieved (and hence they may be called blue-yellow type pseudo white LEDs). Pseudo white LEDs excel in terms of emission efficiency and cost.

Patent Document 1 proposes a technique for attaining brighter displaying in a liquid crystal display device including pseudo white LEDs. Patent Document 1 states that combining pseudo white LEDs having a predetermined emission spectrum and color filters of predetermined spectral transmission characteristics allows the lightness in the white displaying state to be enhanced without altering the chromaticity coordinates of the white displaying state.

CITATION LIST

Patent Literature

[Patent Document 1] Japanese Laid-Open Patent Publication No. 2009-36964

SUMMARY OF INVENTION

Technical Problem

However, the following problems will occur in adapting the color specifications of a liquid crystal display device including pseudo white LEDs, as light sources for backlighting, to high-color-purity standards such as the sRGB standard, the Adobe RGB standard, and the DCI standard (i.e., in an attempt to achieve good color rendition).

A pseudo white LED has an emission spectrum which is relatively broad in the visible light region. Therefore, for high-color-purity compatibilities, the spectral transmission characteristics of color filters need to be strictly controlled in order to cause sufficient spectral separation (color separation) at the color filters. This lowers the transmittance of the color filters, and also the transmittance (panel transmittance) of the entire liquid crystal display panel. Moreover, an increased color filter thickness may cause leakage of light from adjacent pixels (also referred to as "color washout") to occur during viewing from an oblique direction. Furthermore, if the light shielding layer is allowed to have an increased area in order to prevent such leakage of light, then the aperture ratio will decrease, thus further lowering the panel transmittance.

Moreover, Patent Document 1 fails to describe what level of effects can exactly be obtained (i.e., how much the lightness in the white displaying state will be enhanced), and fails to specifically identify the spectral transmittance characteristics of color filters. Furthermore, even by employing the technique of Patent Document 1, it seems difficult to realize color specifications that are compatible with the blue color in high-color-purity standards (the aforementioned sRGB standard, Adobe RGB standard, etc.)

The present invention has been made in view of the above problems, and an objective thereof is to provide a liquid crystal display device which has good color rendition and is able to achieve high panel transmittance.

Solution to Problem

A liquid crystal display device according to an embodiment of the present invention is a liquid crystal display device comprising: a liquid crystal display panel including a red color filter, a green color filter, and a blue color filter; and an illuminator that irradiates the liquid crystal display panel with light, wherein, a spectrum of the light which is emitted by the illuminator has a peak in each of wavelength ranges of not less than 447 nm and not more than 453 nm; not less than 538 nm and not more than 542 nm; not less than 613 nm and not more than 617 nm; not less than 628 nm and not more than 632 nm; and not less than 648 nm and not more than 652 nm; a peak wavelength and a rising wavelength of a transmission spectrum of the red color filter are, respectively, not less than 600 nm; and not less than 568 nm and not more than 572 nm; at wavelengths of 400 nm, 420 nm and 580 nm, the transmission spectrum of the red color filter exhibits transmittances of, respectively, not less than 10% and not more than 15%; not less than 3% and not more than 6%; and not less than 25% and not more than 30%; wavelengths at which the transmission spectrum of the red color filter exhibits a transmittance of 50% are contained within a range of not less than 583 nm and not more than 587 nm; a peak wavelength of a transmission spectrum of the green color filter is not less than 500 nm and not more than 560 nm; at wavelengths of 480 nm and 580 nm, the transmission spectrum of the green color filter exhibits transmittances of, respectively, not less than 45% and not more than 55%; and not less than 65% and not more than 70%; wavelengths at which the transmission spectrum of the green color filter exhibits a transmittance of 50% are contained within a range of not less than 478 nm and not more than 482 nm and a range of not less than 590 nm and not more than 600 nm; a peak wavelength of a transmission spectrum of the blue color filter is not less than 440 nm and not more than 470 nm; at wavelengths of 400 nm and 500 nm, the transmission spectrum of the blue color filter exhibits transmittances of, respectively, not less than 25% and not more than 40%; and not less than 40% and not more than 50%; and wavelengths at which the transmission spectrum of the blue color filter exhibits a transmittance of 50% are contained within a range of not less than 493 nm and not more than 503 nm.

Alternatively, the liquid crystal display device according to an embodiment of the present invention is a liquid crystal display device comprising: a liquid crystal display panel including a red color filter, a green color filter, and a blue color filter; and an illuminator that irradiates the liquid crystal display panel with light, wherein, a spectrum of the light which is emitted by the illuminator has a peak in each of wavelength ranges of not less than 447 nm and not more than 453 nm; not less than 528 nm and not more than 532 nm; not less than 613 nm and not more than 617 nm; not less than 628 nm and not more than 632 nm; and not less than 648 nm and not more than 652 nm; a peak wavelength and a rising wavelength of a transmission spectrum of the red color filter are, respectively, not less than 600 nm; and not less than 568 nm and not more than 572 nm; at wavelengths of 400 nm, 420 nm and 580 nm, the transmission spectrum of the red color filter exhibits transmittances of, respectively, not less than 10% and not more than 15%; not less than 3% and not more than 6%; and not less than 25% and not more than 30%; wavelengths at which the transmission spectrum of the red color filter exhibits a transmittance of 50% are contained within a range of not less than 583 nm and not more than 587 nm; a peak wavelength of a transmission spectrum of the green color filter is not less than 520 nm and not more than 540 nm; at wavelengths of 480 nm and 560 nm, the transmission spectrum of the green color filter exhibits transmittances of, respectively, not less than 15% and not more than 20%; and not less than 20% and not more than 30%; wavelengths at which the transmission spectrum of the green color filter exhibits a transmittance of 50% are contained within a range of not less than 498 nm and not more than 502 nm and a range of not less than 540 nm and not more than 550 nm; a peak wavelength of a transmission spectrum of the blue color filter is not less than 465 nm and not more than 475 nm; and the transmission spectrum of the blue color filter exhibits a transmittance of not less than 20% and not more than 25% at each of wavelengths 400 nm and 500 nm, and exhibits a transmittance of 40% or less at the peak wavelength.

Alternatively, the liquid crystal display device according to an embodiment of the present invention is a liquid crystal display device comprising: a liquid crystal display panel including a red color filter, a green color filter, and a blue color filter; and an illuminator that irradiates the liquid crystal display panel with light, wherein, a spectrum of the light which is emitted by the illuminator has a peak in each of wavelength ranges of not less than 447 nm and not more than 453 nm; not less than 528 nm and not more than 532 nm; not less than 613 nm and not more than 617 nm; not less than 628 nm and not more than 632 nm; and not less than 648 nm and not more than 652 nm; a peak wavelength and a rising wavelength of a transmission spectrum of the red color filter are, respectively, not less than 600 nm; and not less than 573 nm and not more than 577 nm; in a wavelength range of not less than 400 nm and not more than 560 nm, the transmission spectrum of the red color filter exhibits a transmittance of 5% or less; wavelengths at which the transmission spectrum of the red color filter exhibits a transmittance of 50% are contained within a range of not less than 590 nm and not more than 595 nm; a peak wavelength of a transmission spectrum of the green color filter is not less than 520 nm and not more than 540 nm; at wavelengths of 480 nm and 560 nm, the transmission spectrum of the green color filter exhibits transmittances of, respectively, not less than 15% and not more than 20%; and not less than 20% and not more than 30%; wavelengths at which the transmission spectrum of the green color filter exhibits a transmittance of 50% are contained within a range of not less than 498 nm and not more than 502 nm and a range of not less than 540 nm and not more than 550 nm; a peak wavelength of a transmission spectrum of the blue color filter is not less than 465 nm and not more than 475 nm; and the transmission spectrum of the blue color filter exhibits a transmittance of not less than 20% and not more than 25% at each of wavelengths 400 nm and 500 nm, and exhibits a transmittance of 40% or less at the peak wavelength.

In one embodiment, each of the red color filter, the green color filter, and the blue color filter has a thickness of 1.5 μm or less.

In one embodiment, the liquid crystal display panel includes a color filter substrate, the color filter substrate including the red color filter, the green color filter, and the blue color filter; and the color filter substrate further includes a planarization layer formed so as to cover the red color filter, the green color filter, and the blue color filter.

In one embodiment, the liquid crystal display device of the above construction performs displaying in a lateral electric field mode.

In one embodiment, the illuminator includes a light-emitting element to emit excitation light, a green phosphor to emit green light by absorbing the excitation light emitted from the light-emitting element, and a red phosphor to emit red light by absorbing the excitation light emitted from the light-emitting element.

Advantageous Effects of Invention

According to an embodiment of the present invention, there is provided a liquid crystal display device which has good color rendition and is able to achieve high panel transmittance.

DESCRIPTION OF EMBODIMENTS

Hereinafter, embodiments of the present invention will be described with reference to the drawings. Note that the present invention is not to be limited to the embodiments below.

Figure 1:
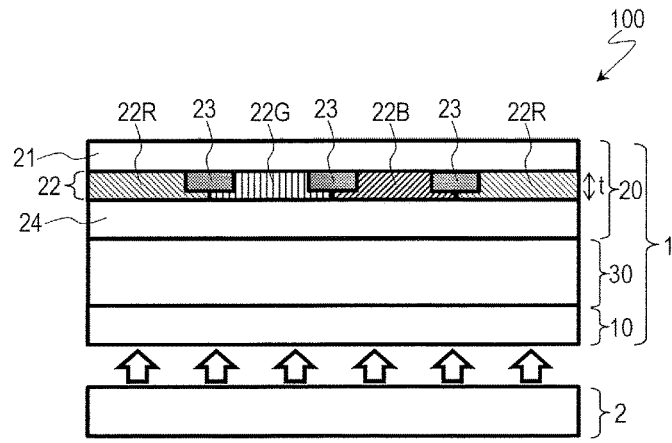
FIG. 1 A cross-sectional view schematically showing a liquid crystal display device 100 according to an embodiment of the present invention.

FIG. 1 shows a liquid crystal display device 100 according to an embodiment of the present invention. FIG. 1 is a cross-sectional view schematically showing the liquid crystal display device 100.

As shown in FIG. 1, the liquid crystal display device 100 includes a liquid crystal display panel 1 and an illuminator (backlight) 2. Moreover, the liquid crystal display device 100 has a plurality of pixels arranged in a matrix array. The plurality of pixels include red pixels for displaying red, green pixels for displaying green, and blue pixels for displaying blue. Three pixels (a red pixel, a green pixel, and a blue pixel) that display different colors constitute one multicolor displaying pixel.

The liquid crystal display panel 1 includes an active matrix substrate (hereinafter referred to as the "TFT substrate") 10, and a color filter substrate (which may also be referred to as the "counter substrate") 20 opposing the TFT substrate 10, with a liquid crystal layer 30 being provided between the TFT substrate 10 and the color filter substrate 20.

The TFT substrate 10 includes pixel electrodes which are provided for the respective pixels and thin film transistors (TFTs) which are electrically connected to the pixel electrodes (neither of them are shown). The TFT substrate 10 also includes scanning lines for supplying scanning signals to the TFTs and signal lines for supplying display signals to the TFTs (neither of them are shown).

The color filter substrate 20 includes red color filters 22R, green color filters 22G, and blue color filters 22B, as well as a light shielding layer (black matrix) 23. The red color filters 22R, green color filters 22G, and blue color filters 22B are provided in, respectively, regions corresponding to the red pixels, regions corresponding to the green pixels, and regions corresponding to the blue pixel regions. The red color filters 22R, green color filters 22G, and blue color filters 22B may be collectively referred to as the color filter layer 22. The light shielding layer 23 is provided in between adjacent pixels. The color filter layer 22 and the light shielding layer 23 are supported by a transparent substrate (e.g., a glass substrate) 21 which is electrically insulative. Moreover, in the example shown in FIG. 1, the color filter substrate 20 further includes a planarization layer 24 that is formed so as to cover the color filter layer 22. The planarization layer 24 may be omitted.

In the case where a TN (Twisted Nematic) mode or a VA (Vertical Alignment) mode is adopted as the display mode, the color filter substrate 20 further includes a counter electrode (common electrode) opposing the pixel electrode. Examples of known VA modes include the MVA (Multi-domain Vertical Alignment) mode and the CPA (Continuous Pinwheel Alignment) mode. In the case where a lateral electric field mode is adopted as the display mode, the TFT substrate 10 further includes a common electrode in addition to the pixel electrodes. Examples of known lateral electric field modes include the IPS (In-Plane Switching) mode and the FFS (Fringe Field Switching) mode.

On the liquid crystal layer 30, depending on the display mode adopted, a liquid crystal layer of a horizontal alignment type or a liquid crystal layer of a vertical-alignment type is provided, for example. On the surface of each of the TFT substrate 10 and the color filter substrate 20 that faces the liquid crystal layer 30, an alignment film (not shown) is provided.

The illuminator 2 irradiates the liquid crystal display panel 1 with light. The illuminator 2 is disposed on the rear face side (i.e., the opposite side from the viewer) of the liquid crystal display panel 1.

In the liquid crystal display device 100 according to an embodiment of the present invention, the spectrum of light which is emitted by the illuminator 2, and the transmission spectra of the red color filters 22R, green color filters 22G, and blue color filters 22B are set as will be described below in Embodiments 1 to 3, whereby good color rendition and high panel transmittance are achieved. As a result, the liquid crystal display device 100 can attain high luminance and low power consumption.

Embodiment 1

In the present embodiment, the emission spectrum of the illuminator 2 and the transmission spectra of the color filter layer 22 are set so that the color specifications of the liquid crystal display device 100 are compatible with the sRGB standard.

Figure 2:
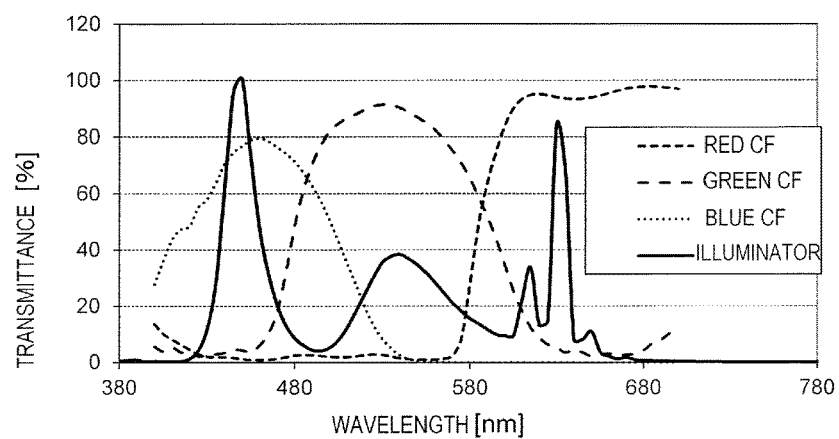
FIG. 2 A graph showing an emission spectrum of an illuminator 2 and a transmission spectrum of a color filter layer 22 (red color filters 22R, green color filters 22G, and blue color filters 22B) in Embodiment 1.
Figure 3:
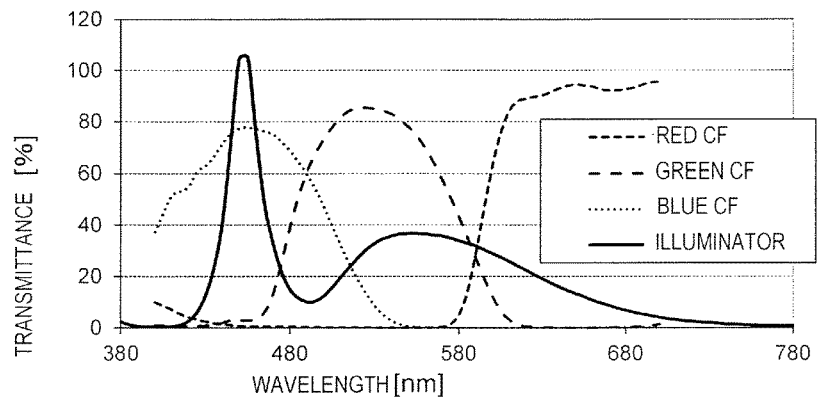
FIG. 3 A graph showing an emission spectrum of an illuminator and a transmission spectrum of a color filter layer (red color filters, green color filters, and blue color filters) in Comparative Example 1.

FIG. 2 shows an emission spectrum of the illuminator 2 and transmission spectra of the color filter layer 22 (red color filters 22R, green color filters 22G, and blue color filters 22B) in the present embodiment. FIG. 3 shows an emission spectrum of the illuminator and transmission spectra of color filter layer (red color filters, green color filters, and blue color filters) of a liquid crystal display device according to Comparative Example 1. The illuminator of the liquid crystal display device of Comparative Example 1 includes blue-yellow type pseudo white LEDs as the light sources, and the red color filters, green color filters, and blue color filters of the liquid crystal display device of Comparative Example 1 have spectral transmission characteristics which are optimized for blue-yellow type pseudo white LEDs so as to be compatible with the sRGB standard. Note that the graduation on the vertical axis of FIG. 2 and FIG. 3 only indicates transmittance (%) (that is, emission intensity is not shown).

As can be seen from a comparison between FIG. 2 and FIG. 3, the emission spectrum of the illuminator 2 of the present embodiment and the emission spectrum of the illuminator of Comparative Example 1 are different. Moreover, the transmission spectra of the red color filters 22R, green color filters 22G, and blue color filters 22B of the present embodiment are different from the transmission spectra of the red color filters, green color filters, and blue color filters of Comparative Example 1. Hereinafter, with reference also to FIG. 4 to FIG. 7, the above differences will be further described.

Figure 4:
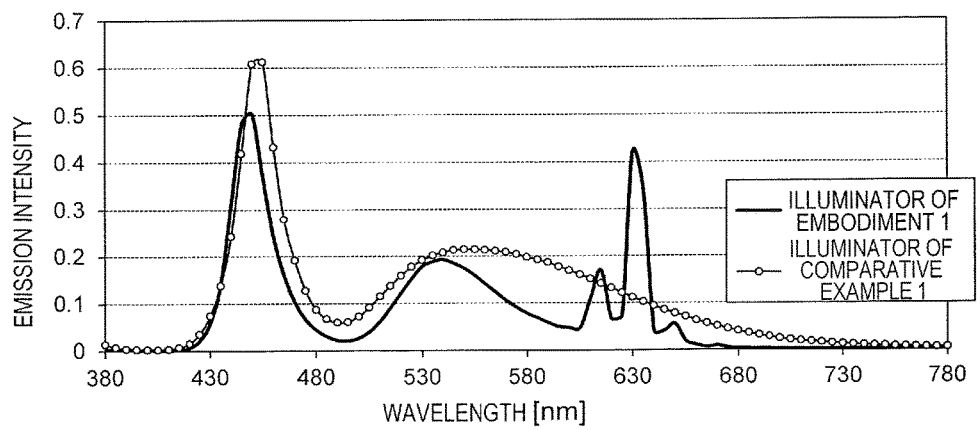
FIG. 4 A graph showing an emission spectrum of the illuminator 2 of Embodiment 1 with an emission spectrum of the illuminator of Comparative Example 1.

FIG. 4 is a graph showing an emission spectrum of the illuminator 2 of the present embodiment with an emission spectrum of the illuminator of Comparative Example 1. As can be seen from FIG. 4, the spectrum of light which is emitted by the illuminator 2 of the present embodiment has a peak in each of the wavelength ranges of not less than 447 nm and not more than 453 nm; not less than 538 nm and not more than 542 nm; not less than 613 nm and not more than 617 nm; not less than 628 nm and not more than 632 nm; and not less than 648 nm and not more than 652 nm. In other words, the emission spectrum of the illuminator 2 of the present embodiment has one peak each in the wavelength range corresponding to blue and the wavelength range corresponding to green, as well as three peaks in the wavelength range corresponding to red. On the other hand, the emission spectrum of the illuminator of Comparative Example 1 has respective peaks in the wavelength range corresponding to blue and the wavelength range corresponding to green, but no peak in the wavelength range corresponding to red.

Figure 5:
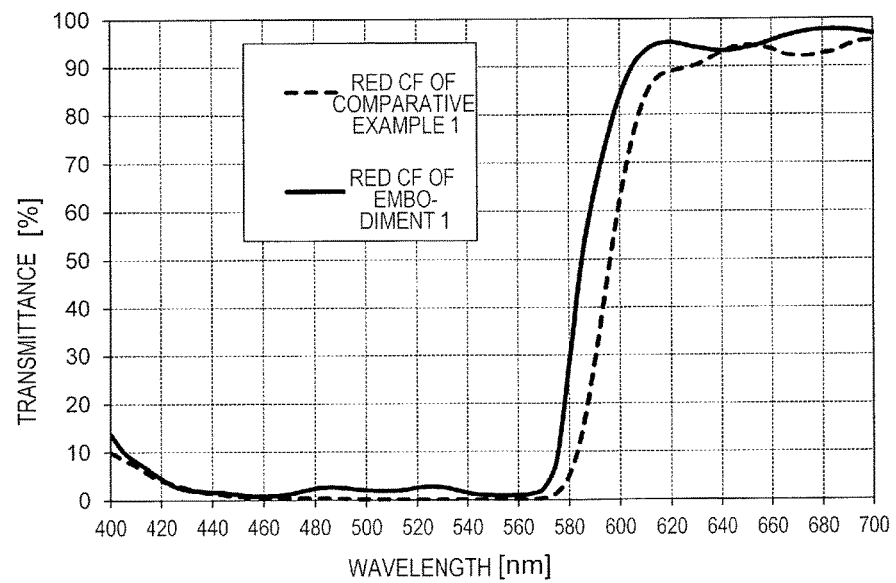
FIG. 5 A graph showing a transmission spectrum of the red color filters 22R of Embodiment 1 with a transmission spectrum of red color filters of Comparative Example 1.

FIG. 5 is a graph showing a transmission spectrum of the red color filters 22R of the present embodiment with a transmission spectrum of the red color filters of Comparative Example 1. As can be seen from FIG. 5, the peak wavelength and rising wavelength of the transmission spectrum of the red color filters 22R of the present embodiment are, respectively, not less than 600 nm; and not less than 568 nm and not more than 572 nm. Note that the "rising wavelength" marks the beginning of a wavelength region which undergoes a transmittance increase of 15% or more per 5 nm.

Moreover, at wavelengths of 400 nm, 420 nm and 580 nm, the transmission spectrum of the red color filters 22R of the present embodiment exhibits transmittances of, respectively, not less than 10% and not more than 15%; not less than 3% and not more than 6%; and not less than 25% and not more than 30%. Furthermore, the wavelengths at which the transmission spectrum of the red color filters 22R of the present embodiment exhibits a transmittance of 50% are contained within a range of not less than 583 nm and not more than 587 nm.

Figure 6:
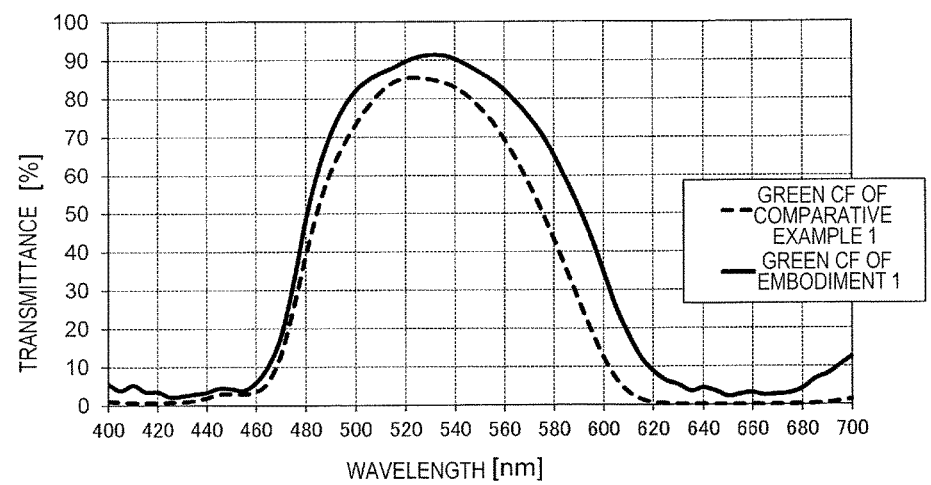
FIG. 6 A graph showing a transmission spectrum of the green color filters 22G of Embodiment 1 with a transmission spectrum of green color filters of Comparative Example 1.

FIG. 6 is a graph showing a transmission spectrum of the green color filters 22G of the present embodiment with a transmission spectrum of the green color filters of Comparative Example 1. As can be seen from FIG. 6, the peak wavelength of the transmission spectrum of the green color filters 22G of the present embodiment is not less than 500 nm and not more than 560 nm.

Moreover, at wavelengths 480 nm and 580 nm, the transmission spectrum of the green color filters 22G of the present embodiment exhibits transmittances of, respectively, not less than 45% and not more than 55%; and not less than 65% and not more than 70%. Furthermore, the wavelengths at which the transmission spectrum of the green color filters 22G of the present embodiment exhibits a transmittance of 50% are contained within a range of not less than 478 nm and not more than 482 nm and a range of not less than 590 nm and not more than 600 nm.

Figure 7:
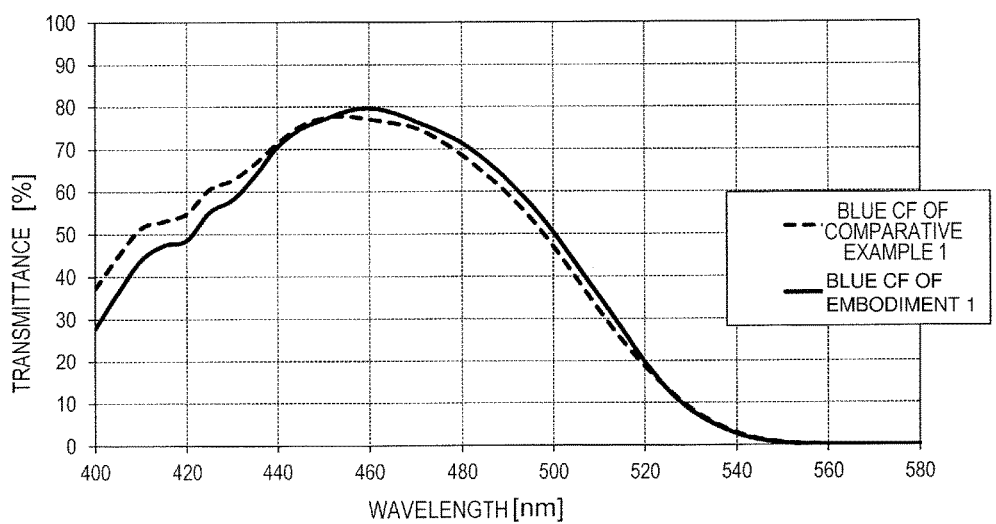
FIG. 7 A graph showing a transmission spectrum of the blue color filters 22B of Embodiment 1 with a transmission spectrum of blue color filters of Comparative Example 1.

FIG. 7 is a graph showing a transmission spectrum of the blue color filters 22B of the present embodiment with a transmission spectrum of the blue color filters of Comparative Example 1. As can be seen from FIG. 7, the peak wavelength of the transmission spectrum of the blue color filters 22B of the present embodiment is not less than 440 nm and not more than 470 nm.

Moreover, at wavelengths of 400 nm and 500 nm, the transmission spectrum of the blue color filters 22B of the present embodiment exhibits transmittances of, respectively, not less than 25% and not more than 40%; and not less than 40% and not more than 50%. Furthermore, the wavelengths at which the transmission spectrum of the blue color filters 22B of the present embodiment exhibits a transmittance of 50% are contained within a range of not less than 493 nm and not more than 503 nm.

In Comparative Example 1, the light which is emitted by the illuminator (i.e., light which is emitted by blue-yellow type pseudo white LEDs) is not clearly separated into a red component and a green component, as shown in FIG. 3 and FIG. 4. On the other hand, in the present embodiment, the light which is emitted by the illuminator 2 is clearly separated into a red component and a green component (and of course a blue component), as shown in FIG. 2 and FIG. 4. Therefore, according to the present embodiment, the color filter layer 22 may effect a lesser degree of spectral separation than in Comparative Example 1. Consequently, even if the spectral transmission characteristics of the color filter layer 22 are adjusted so as to be compatible with the sRGB standard (i.e., if the color filter material is so chosen), the transmittances of the color filter layer 22 can still be maintained high. As a result, the panel transmittance is improved.

Table 1 below shows respective transmittances of the red color filters 22R, green color filters 22G, and blue color filters 22B of the present embodiment (as average transmittances in the visible light region) and a transmittance of the entire color filter layer 22 (i.e., total). Moreover, Table 2 below shows respective transmittances of the red color filters, green color filters, and blue color filters (as average transmittances in the visible light region) and a transmittance (i.e., total) of the entire color filter layer in Comparative Example 1. Note that Table 1 and Table 2 also show, for each of the present embodiment and Comparative Example 1, respective chromaticities x, y of red being displayed by the red pixels, green being displayed by the green pixels, and blue being displayed by the blue pixels.

TABLE 1

| | | Embodiment 1 | | | |
| --- | --- | --- | --- | --- | --- |
| | | red | green | blue | total |
| color filter transmittance | | 21.64 | 67.43 | 7.60 | 32.22 |
| chromaticity | x | 0.64 | 0.30 | 0.15 | — |
| | y | 0.33 | 0.60 | 0.06 | — |

TABLE 2

| Comparative Example 1 | | | | |
| --- | --- | --- | --- | --- |
|  | red | green | blue | total |
| color filter transmittance | 14.95 | 55.08 | 7.60 | 25.87 |
| chromaticity  x | 0.64 | 0.30 | 0.15 | — |
| y | 0.33 | 0.60 | 0.06 | — |

As can be seen from Table 1 and Table 2, the red, green, and blue chromaticities x, y are identical between the present embodiment and Comparative Example 1. In other words, the present embodiment attains a similar level of color rendition to that of Comparative Example 1. While the total transmittance in Comparative Example 1 is 25.87%, the total transmittance in the present embodiment is 32.22%. In other words, the efficiency of light utilization in the present embodiment is improved by about 24.5% relative to Comparative Example 1.

As described above, according to the present embodiment, good color rendition and high panel transmittance are achieved.

Embodiment 2

In the present embodiment, the emission spectrum of the illuminator 2 and the transmission spectrum of the color filter layer are set so that the color specifications of the liquid crystal display device 100 are compatible with the Adobe RGB standard. Hereinafter, with reference to FIG. 8 to FIG. 11, differences between the emission spectrum of the illuminator 2 and the transmission spectra of the color filter layer 22 of the present embodiment and the emission spectrum of the illuminator and the transmission spectrum of the color filter layer of Comparative Example 2 will be described. The illuminator of the liquid crystal display device of Comparative Example 2 includes blue-yellow type pseudo white LEDs as the light sources, and the red color filters, green color filters, and blue color filters of the liquid crystal display device of Comparative Example 2 have spectral transmission characteristics which are optimized for blue-yellow type pseudo white LEDs so as to be compatible with the Adobe RGB standard.

Figure 8:
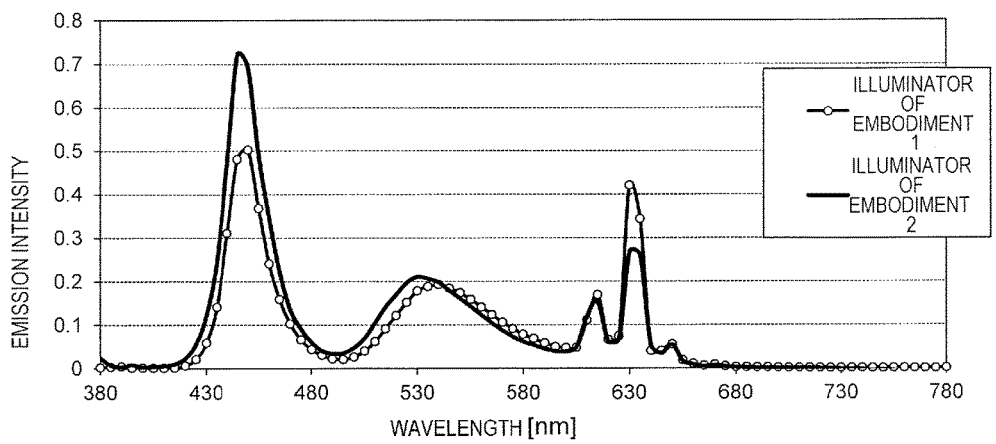
FIG. 8 A graph showing an emission spectrum of the illuminator 2 of Embodiment 2 with an emission spectrum of the illuminator 2 of Embodiment 1.

FIG. 8 is a graph showing an emission spectrum of the illuminator 2 of the present embodiment with an emission spectrum of the illuminator 2 of Embodiment 1. As for the emission spectrum of the illuminator of Comparative Example 2, see FIG. 4 because it is identical to the emission spectrum of the illuminator of Comparative Example 1.

As can be seen from FIG. 8, the spectrum of light which is emitted by the illuminator 2 of the present embodiment has a peak in each of the wavelength ranges of not less than 447 nm and not more than 453 nm; not less than 528 nm and not more than 532 nm; not less than 613 nm and not more than 617 nm; not less than 628 nm and not more than 632 nm; and not less than 648 nm and not more than 652 nm. In the emission spectrum of the illuminator 2 of Embodiment 1, the green peak wavelength is near 540 nm (within a range of not less than 538 nm and not more than 542 nm); on the other hand, in the emission spectrum of the illuminator 2 of the present embodiment, the green peak wavelength is near 530 nm (within a range of not less than 528 nm and not more than 532 nm); this marks a difference between the emission spectrum of the illuminator 2 of the present embodiment and the emission spectrum of the illuminator of Embodiment 1. This difference is because of the green color gamut being wider in the Adobe RGB standard than in the sRGB standard.

Of course, the emission spectrum of the illuminator 2 of the present embodiment is also different from the emission spectrum of the illuminator of Comparative Example 2. The emission spectrum of the illuminator 2 of the present embodiment has one peak each in the wavelength range corresponding to blue and the wavelength range corresponding to green, as well as three peaks in the wavelength range corresponding to red; on the other hand, the emission spectrum of the illuminator of Comparative Example 2 has respective peaks in the wavelength range corresponding to blue and the wavelength range corresponding to green, but no peak in the wavelength range corresponding to red.

Figure 9:
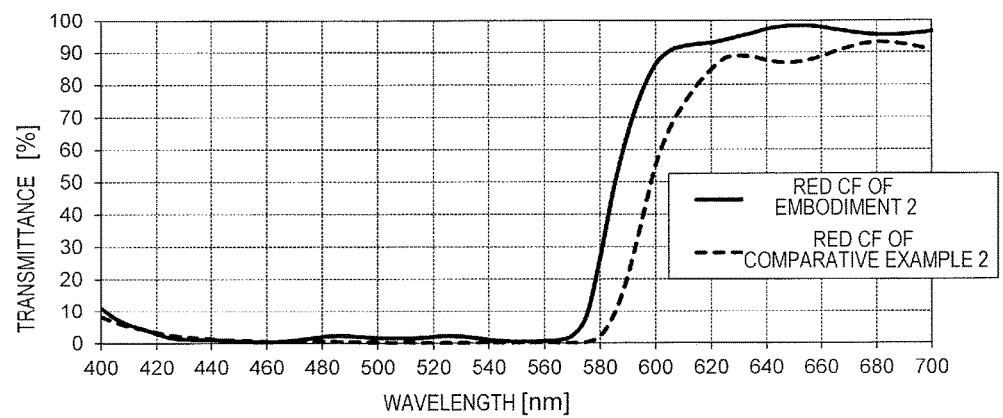
FIG. 9 A graph showing a transmission spectrum of red color filters 22R of Embodiment 2 with a transmission spectrum of red color filters of Comparative Example 2.

FIG. 9 is a graph showing a transmission spectrum of the red color filters 22R of the present embodiment with a transmission spectrum of the red color filters of Comparative Example 2. As can be seen from FIG. 9, the peak wavelength and rising wavelength of the transmission spectrum of the red color filters 22R of the present embodiment are, respectively, not less than 600 nm; and not less than 568 nm and not more than 572 nm.

Moreover, at wavelengths of 400 nm, 420 nm and 580 nm, the transmission spectrum of the red color filters 22R of the present embodiment exhibits transmittances of, respectively, not less than 10% and not more than 15%; not less than 3% and not more than 6%; and not less than 25% and not more than 30%. Furthermore, the wavelengths at which the transmission spectrum of the red color filters 22R of the present embodiment exhibits a transmittance of 50% are contained within a range of not less than 583 nm and not more than 587 nm.

Figure 10:
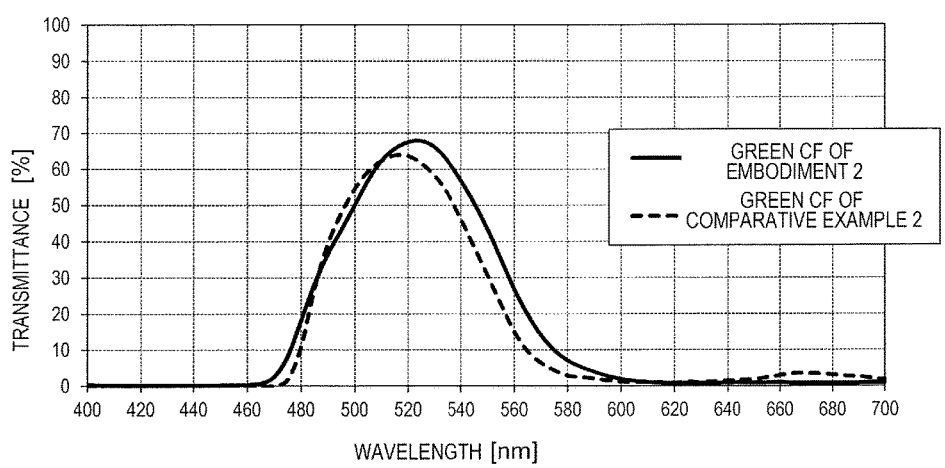
FIG. 10 A graph showing a transmission spectrum of green color filters 22G of Embodiment 2 with a transmission spectrum of green color filters of Comparative Example 2.

FIG. 10 is a graph showing a transmission spectrum of the green color filters 22G of the present embodiment with a transmission spectrum of the green color filters of Comparative Example 2. As can be seen from FIG. 10, the peak wavelength of the transmission spectrum of the green color filters 22G of the present embodiment is not less than 520 nm and not more than 540 nm.

Moreover, at wavelengths of 480 nm and 560 nm, the transmission spectrum of the green color filters 22G of the present embodiment exhibits transmittances of, respectively, not less than 15% and not more than 20%; and not less than 20% and not more than 30%. Furthermore, the wavelengths at which the transmission spectrum of the green color filters 22G of the present embodiment exhibits a transmittance of 50% are contained within a range of not less than 498 nm and not more than 502 nm and a range of not less than 540 nm and not more than 550 nm.

Figure 11:
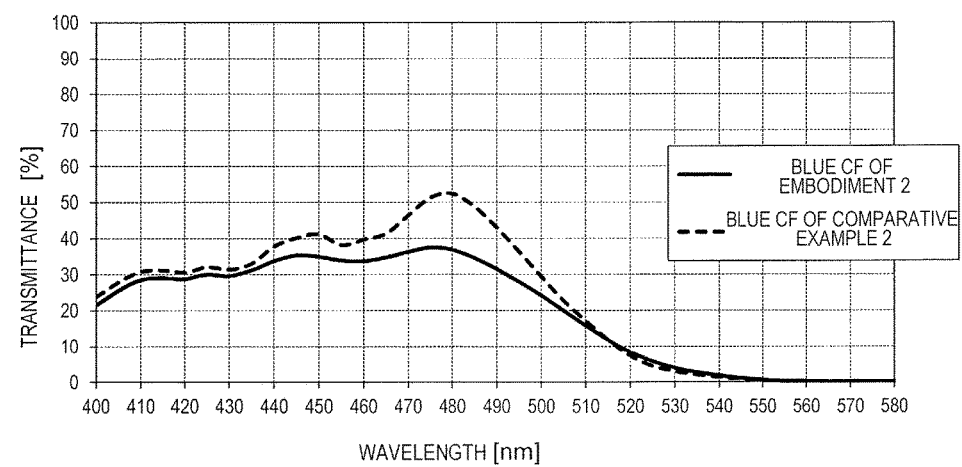
FIG. 11 A graph showing a transmission spectrum of blue color filters 22B of Embodiment 2 with a transmission spectrum of blue color filters of Comparative Example 2.

FIG. 11 is a graph showing a transmission spectrum of the blue color filters 22B of the present embodiment with a transmission spectrum of the blue color filters of Comparative Example 2. As can be seen from FIG. 11, the peak wavelength of the transmission spectrum of the blue color filters 22B of the present embodiment is not less than 465 nm and not more than 475 nm.

Moreover, the transmission spectrum of the blue color filters 22B of the present embodiment exhibits a transmittance of not less than 20% and not more than 25% at each of wavelengths 400 nm and 500 nm, and exhibits a transmittance of 40% or less at the peak wavelength.

In Comparative Example 2, the light which is emitted by the illuminator (i.e., light which is emitted by blue-yellow type pseudo white LEDs) is not clearly separated into a red component and a green component, as shown in FIG. 4. On the other hand, in the present embodiment, the light which is emitted by the illuminator 2 is clearly separated into a red component and a green component (and of course a blue component), as shown in FIG. 8. Therefore, according to the present embodiment, the color filter layer 22 may effect a lesser degree of spectral separation than in Comparative Example 2. Consequently, even if the spectral transmission characteristics of the color filter layer 22 are adjusted so as to be compatible with the Adobe RGB standard (i.e., if the color filter material is so chosen), the transmittances of the color filter layer 22 can still be maintained high. As a result, the panel transmittance is improved.

Table 3 below shows respective transmittances of the red color filters 22R, green color filters 22G, and blue color filters 22B of the present embodiment (as average transmittances in the visible light region) and a transmittance of the entire color filter layer 22 (i.e., total). Moreover, Table 4 below shows respective transmittances of the red color filters, green color filters, and blue color filters (as average transmittances in the visible light region) and a transmittance (i.e., total) of the entire color filter layer in Comparative Example 2. Note that Table 3 and Table 4 also show, for each of the present embodiment and Comparative Example 2, respective chromaticities x, y of red being displayed by the red pixels, green being displayed by the green pixels, and blue being displayed by the blue pixels.

TABLE 3

| Embodiment 2 | | | | |
| --- | --- | --- | --- | --- |
| | red | green | blue | total |
| color filter transmittance | 17.86 | 36.6 | 4.93 | 19.80 |
| chromaticity x | 0.64 | 0.21 | 0.15 | — |
| y | 0.33 | 0.71 | 0.06 | — |

TABLE 4

| Comparative Example 2 | | | | |
| --- | --- | --- | --- | --- |
| | red | green | blue | total |
| color filter transmittance | 12.74 | 23.62 | 3.50 | 13.29 |
| chromaticity x | 0.64 | 0.21 | 0.15 | — |
| y | 0.33 | 0.71 | 0.06 | — |

As can be seen from Table 3 and Table 4, the red, green, and blue chromaticities x, y are identical between the present embodiment and Comparative Example 2. In other words, the present embodiment attains a similar level of color rendition to that of Comparative Example 2. While the total transmittance in Comparative Example 2 is 13.29%, the total transmittance in the present embodiment is 19.80%. In other words, the efficiency of light utilization in the present embodiment is improved by about 49% relative to Comparative Example 2.

As described above, good color rendition and high panel transmittance are achieved also in the present embodiment.

Embodiment 3

In the present embodiment, the emission spectrum of the illuminator 2 and the transmission spectrum of the color filter layer are set so that the color specifications of the liquid crystal display device 100 are compatible with the Adobe RGB standard, and further compatible with the DCI (Digital-Cinema-Initiatives) standard with respect to red. In the present embodiment, the emission spectrum of the illuminator 2, the transmission spectrum of the green color filters 22G and the transmission spectrum of the blue color filters 22B are identical to those in Embodiment 2.

Hereinafter, with reference to FIG. 12, differences between the transmission spectrum of the red color filters 22R of the present embodiment and the transmission spectrum of the red color filters of Comparative Example 3 will be described. The red color filters of the liquid crystal display device of Comparative Example 3 have spectral transmission characteristics which are optimized for blue-yellow type pseudo white LEDs so as to compatible with the DCI standard.

Figure 12:
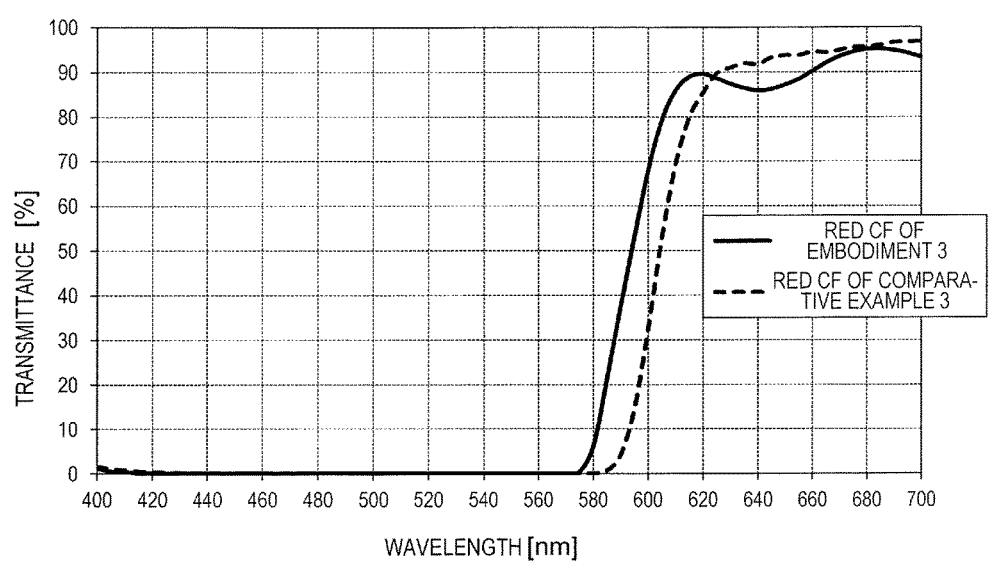
FIG. 12 A graph showing a transmission spectrum of red color filters 22R of Embodiment 3 with a transmission spectrum of red color filters of Comparative Example 3.

FIG. 12 is a graph showing a transmission spectrum of the red color filters 22R of the present embodiment with a transmission spectrum of the red color filters of Comparative Example 2. As can be seen from FIG. 12, the peak wavelength and rising wavelength of the transmission spectrum of the red color filters 22R of the present embodiment are, respectively, not less than 600 nm; and not less than 573 nm and not more than 577 nm.

Moreover, the transmission spectrum of the red color filters 22R of the present embodiment exhibits a transmittance of 5% or less, in a wavelength range of not less than 400 nm and not more than 560 nm. Furthermore, the wavelengths at which the transmission spectrum of the red color filters 22R of the present embodiment exhibits a transmittance of 50% are contained within a range of not less than 590 nm and not more than 595 nm.

In the present embodiment, too, for reasons similar to those described for Embodiments 1 and 2, the transmittances of the color filter layer 22 can be maintained high even if the spectral transmission characteristics of the color filter layer 22 are adjusted so as to be compatible with the Adobe RGB standard (and further compatible with the DCI standard with respect to red). As a result, the panel transmittance is improved.

Table 5 below shows respective transmittances of the red color filters 22R, green color filters 22G, and blue color filters 22B of the present embodiment (as average transmittances in the visible light region) and a transmittance of the entire color filter layer 22 (i.e., total). Moreover, Table 6 below shows respective transmittances of the red color filters, green color filters, and blue color filters (as average transmittances in the visible light region) and a transmittance (i.e., total) of the entire color filter layer in Comparative Example 3. Note that Table 5 and Table 6 also show, for each of the present embodiment and Comparative Example 3, respective chromaticities x, y of red being displayed by the red pixels, green being displayed by the green pixels, and blue being displayed by the blue pixels.

TABLE 5

| Embodiment 3 | | | | |
| --- | --- | --- | --- | --- |
| | red | green | blue | total |
| color filter transmittance | 15.02 | 36.17 | 4.78 | 18.66 |
| chromaticity x | 0.68 | 0.21 | 0.15 | — |
| y | 0.32 | 0.71 | 0.06 | — |

TABLE 6

| Comparative Example 3 | | | | | |
| --- | --- | --- | --- | --- | --- |
| | | red | green | blue | total |
| color filter transmittance | | 9.86 | 23.62 | 3.50 | 12.33 |
| chromaticity | x | 0.68 | 0.21 | 0.15 | — |
| | y | 0.32 | 0.71 | 0.06 | — |

As can be seen from Table 5 and Table 6, the red, green, and blue chromaticities x, y are identical between the present embodiment and Comparative Example 3. In other words, the present embodiment attains a similar level of color rendition to that of Comparative Example 3. While the total transmittance in Comparative Example 3 is 12.33%, the total transmittance in the present embodiment is 18.66%. In other words, the efficiency of light utilization in the present embodiment is improved by about 51% relative to Comparative Example 3.

As described above, good color rendition and high panel transmittance are achieved also in the present embodiment.

(Thickness of Color Filter Layer)

In the liquid crystal display device 100 according to an embodiment of the present invention, the emission spectrum of the illuminator 2 and the transmission spectra of the color filter layer 22 are set as described in Embodiments 1 to 3, whereby good color rendition and high panel transmittance are achieved. As a result, the liquid crystal display device 100 can attain high luminance and low power consumption.

The fact that a lesser degree of spectral separation would suffice in the color filter layer 22 means that the thickness of the color filter layer 22 can be smaller than the thickness of the color filter layers in Comparative Examples 1 to 3. Specifically, according to an embodiment of the present invention, the thickness t of the color filter layer 22 (i.e., the thickness of each of the red color filters 22R, green color filters 22G, and blue color filters 22B) can be 1.5 µm or less, whereby leakage of light from adjacent pixels when viewed from an oblique direction (color washout) can be suppressed. Hereinafter, this aspect will be described in more detail.

Figure 13:
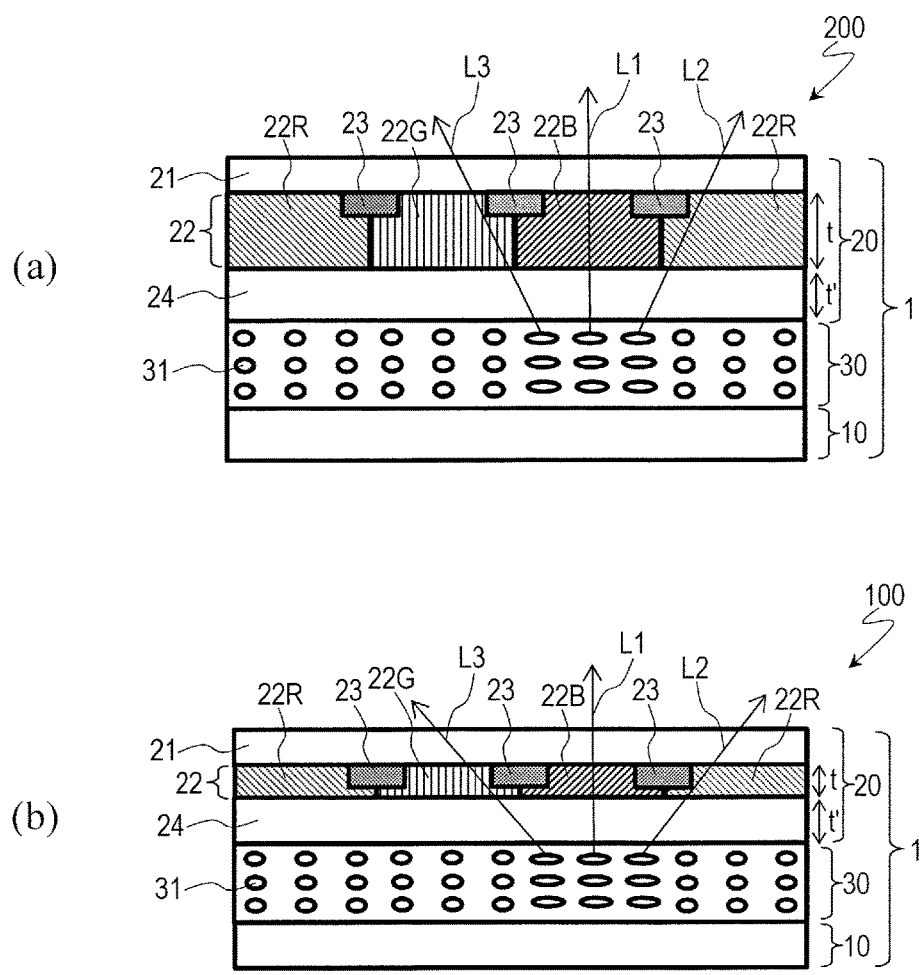
FIG. 13 (a) is a diagram schematically showing how a color washout may occur in a liquid crystal display device 200 according to Comparative Example; and (b) is a diagram schematically showing how a color washout may be suppressed in the liquid crystal display device 100 according to an embodiment of the present invention.

FIG. 13(a) schematically shows how a color washout may occur in a liquid crystal display device 200 of Comparative Example. FIG. 13(b) schematically shows how a color washout may be suppressed in the liquid crystal display device 100 according to an embodiment of the present invention. Note that FIGS. 13(a) and (b) illustrate examples where only the blue pixels are lit (i.e., voltage is applied only to the liquid crystal layer 30 in the blue pixels, thus causing a change only in the alignment state of liquid crystal molecules 31 in the blue pixels).

In the liquid crystal display device 200 of Comparative Example, the transmission spectra of the color filter layer 22 are optimized for blue-yellow type pseudo white LEDs (i.e., set as in Comparative Examples 1 to 3 above) so that its color specifications are compatible with high-color-purity standards. As a result, the thickness t of the color filter layer 22 will be on the order of 2.0 µm to 3.0 µm, thus resulting in a large distance between the liquid crystal layer 30 and the light shielding layer 23. Consequently, while blue (i.e., only light L1 which has passed through the liquid crystal layer 30 in the blue pixels and then is transmitted through the blue color filters 22B) will be perceived during frontal viewing, red (i.e., light L2 which has passed through the liquid crystal layer 30 in the blue pixels and then is transmitted through the red color filters 22R) and green (i.e., light L3 which has passed through the liquid crystal layer 30 in the blue pixels and then is transmitted through the green color filters 22G) will also be perceived under oblique viewing at a shallow angle. Thus, when the thickness of the color filter layer 20 is large, leakage of light from adjacent pixels will occur and degrade the display quality.

On the other hand, in the liquid crystal display device 100 according to an embodiment of the present invention, the thickness of the color filter layer 20 can be 1.5 µm or less, thus reducing the distance between the liquid crystal layer 30 and the light shielding layer 23. As a result, leakage of light from adjacent pixels is less likely to occur when obliquely viewed at a shallow angle. That is, in the example of FIG. 13(b) (i.e., an example where only the blue pixels are lit), any red (light L2) and green (light L3) leaking from adjacent pixels will only be perceived under oblique viewing at a fairly deep angle. Thus, because of the thickness of the color filter layer 20 being small, leakage of light (color washout) from adjacent pixels is suppressed.

As can be seen from what has already been described, it depends on the distance between the liquid crystal layer 30 and the light shielding layer 23 whether or not leakage of light from adjacent pixels will occur. Now, results of calculating through simulation the chromaticity x, y of blue as viewed from the frontal direction and blue as viewed obliquely at 75°, where a total (hereinafter referred to as the "total thickness") of the thickness t of the color filter layer 22 and the thickness t' of the planarization layer 24 was varied, will be described.

Figure 14:
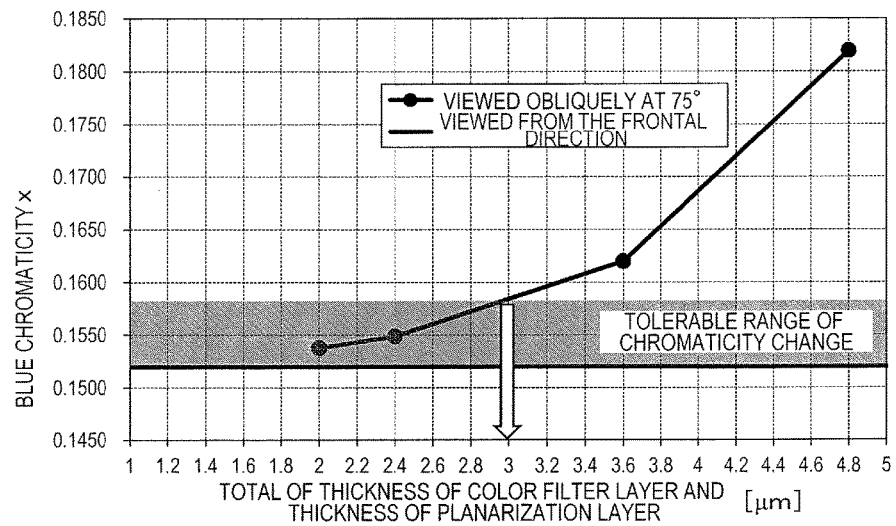
FIGS. 14 (a) and (b) are graphs showing results of calculating through simulation the chromaticity x, y of blue as viewed from the frontal direction and blue as viewed obliquely at 75°, where a total (total thickness) of the thickness t of the color filter layer 22 and the thickness t' of a planarization layer 24 was varied: (a) shows a relationship between the chromaticity x as obtained through the simulation and the total thickness (μm); and (b) shows a relationship between the chromaticity y as obtained through the simulation and the total thickness (μm).
Figure 14:
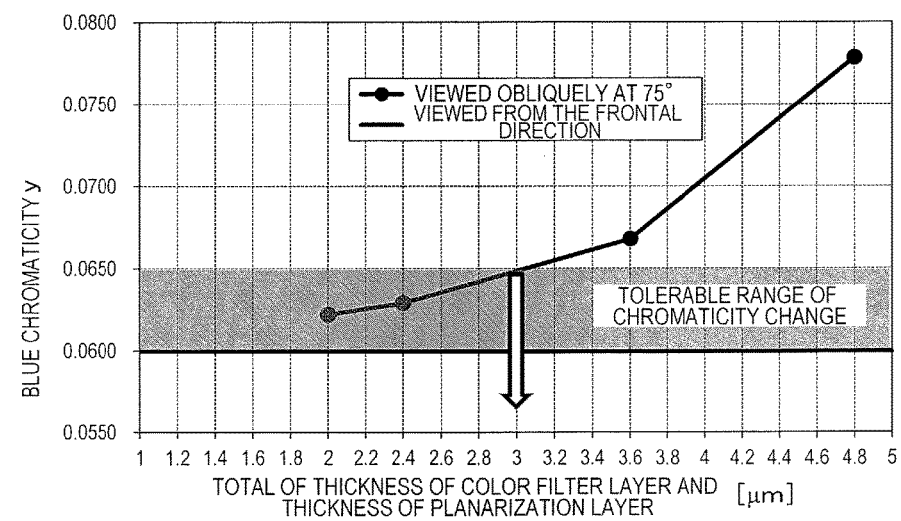

FIG. 14(a) is a graph showing a relationship between the chromaticity x as obtained through the simulation and the total thickness (µm), and FIG. 14(b) is a graph showing a relationship between the chromaticity y as obtained through the simulation and the total thickness (µm). FIGS. 14(a) and (b) also show a range of changes in chromaticity that will be tolerated (tolerable range of chromaticity change).

As can be seen from FIGS. 14(a) and (b), the blue chromaticity x, y as viewed obliquely at 75° is deviated from the blue chromaticity (x=0.1520, y=0.0600) as viewed from the frontal direction, this deviation becoming larger as the total thickness (t+t') increases. It can also be seen from FIGS. 14(a) and (b) that, for both chromaticity values x and y, the chromaticity deviation under oblique viewing falls within the tolerable range of chromaticity change so long as the total thickness is about 3 µm or less.

In order to sufficiently planarize the ruggednesses on the color filter layer 22, it is preferable that the thickness t' of the planarization film 24 is 1.5 µm or more. Therefore, the thickness t of the color filter layer 22 being 1.5 µm or less allows the total thickness to be 3 µm or less, whereby a decrease in display quality due to color washouts can be prevented.

Note that it depends on the distance between the liquid crystal layer 30 and the light shielding layer 23 whether a color washout will occur or not. Therefore, it may be said that a color washout is more likely to occur in a construction which includes the planarization layer 24 than in a construction which lacks the planarization layer 24. On the other hand, in the case where a lateral electric field mode such as the IPS mode or the FFS mode is adopted as the display mode, it is preferable to provide the planarization layer 24, for the following reasons. In the case of a lateral electric field mode, unlike in a vertical electric field mode (the TN mode or the VA mode), no electrode (transparent electrode layer) is provided on the side of the counter substrate (color filter substrate) facing the liquid crystal layer; this leaves the color filter material exposed on the liquid crystal layer side.

Therefore, the materials of the red color filters, the green color filters, and the blue color filters having mutually different dielectric constants will hinder generation of an adequate lateral electric field; a planarization layer is preferably provided in order to prevent this. This means that the significance (effect) of adopting the construction according to an embodiment of the present invention is particularly outstanding in the case where the display mode is a lateral electric field mode.

As described above, by ensuring that the thickness t of the color filter layer 22 (i.e., the thickness of each of the red color filters 22R, green color filters 22G, and blue color filters 22B) is 1.5 µm or less, it is possible to suppress leakage of light from adjacent pixels when viewed from an oblique direction, and improve the display quality.

Moreover, the area of the light shielding layer 23 may be decreased until the level of light leakage from adjacent pixels comes on par with that of the liquid crystal display device 200 of Comparative Example, in which case a high aperture ratio will be attained, thereby further improving the efficiency of light utilization.

(Enlargement of Light Shielding Layer)

In order to better suppress leakage of light from adjacent pixels, the area of the light shielding layer 23 may be increased. Although the aperture ratio will decrease in that case, the transmittance of the color filter layer 22 can be enhanced according to an embodiment of the present invention, whereby a panel transmittance which is similar to the conventional level or even above can be obtained. Hereinafter, this will be described more specifically with reference to FIG. 15.

FIG. 15(a) is a plan view schematically showing a TFT substrate 10 of a 7 inch WXGA liquid crystal display panel 1, and FIGS. 15(b) and (c) are plan views schematically showing a color filter substrate 20 opposing the TFT substrate 10 shown in FIG. 15(a).

As is shown in FIG. 15(a), the TFT substrate 10 includes a TFT 11 provided for each pixel, a scanning line 12 for supplying a scanning signal to the TFT 11, and a signal line 13 for supplying a display signal to the TFT 11. In FIG. 15(a), pixel electrodes, contact holes, and the like are omitted.

As shown in FIG. 15(b) and FIG. 15(c), the color filter substrate 20 includes a light shielding layer 23. The light shielding layer 23 is shaped in a grating form such that substantially rectangular apertures are located in regions corresponding to the respective pixels.

In the example shown in FIG. 15(b), the width w of each portion of the light shielding layer 23 that overlaps a signal line 13 is 7 µm, whereas the width w' of each aperture (i.e., a region where the light shielding layer 23 is not formed) along the row direction (i.e., the direction that the scanning lines 12 extend) is 32 µm. In this case, the aperture ratio is about 58%.

On the other hand, in the example shown in FIG. 15(c), the width w of each portion of the light shielding layer 23 that overlaps a signal line 13 is 11 µm, whereas the width w' of each aperture along the row direction is 28 µm. In this case, the aperture ratio is about 51%.

Figure 15:
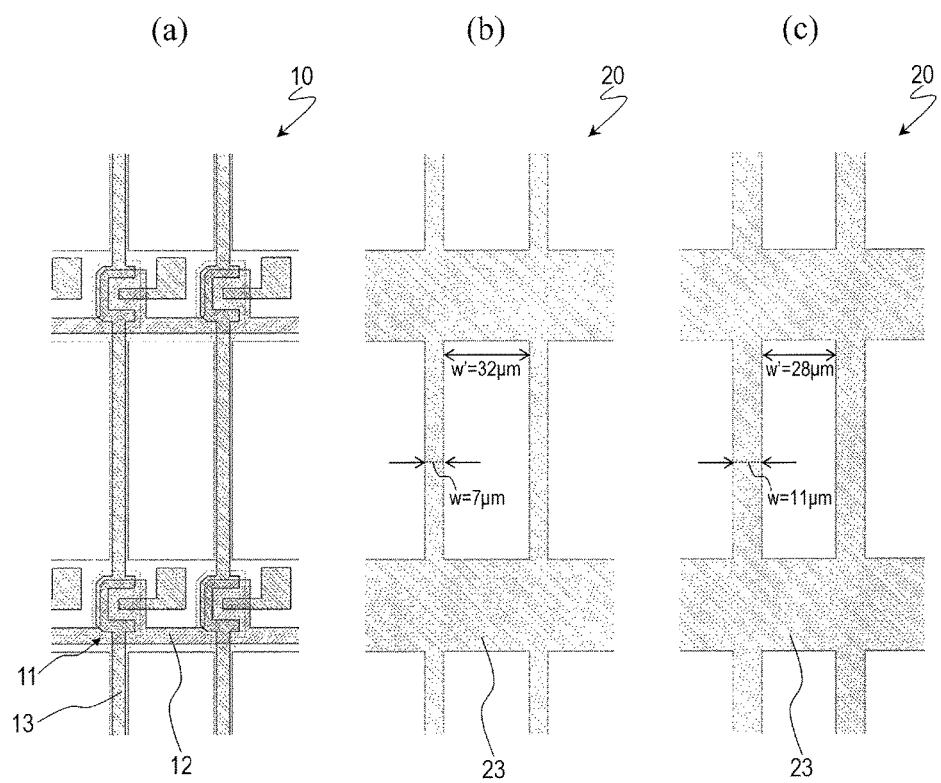
FIG. 15 (a) is a plan view schematically showing a TFT substrate 10 of a 7 inch WXGA liquid crystal display panel 1; and (b) and (c) are plan views schematically showing a color filter substrate 20 opposing the TFT substrate 10 shown in (a).

In the example of FIG. 15(c), the width w of each portion of the light shielding layer 23 that overlaps a signal line 13 is greater than in the example of FIG. 15(b). Therefore, the effect of suppressing leakage of light from adjacent pixels is higher in the example of FIG. 15(c) than in the example of FIG. 15(b). Moreover, the aperture ratio is lower in the example shown in FIG. 15(c) than in the example shown in FIG. 15, but according to an embodiment of the present invention it is possible to enhance the transmittance of the color filter layer 22; therefore, even if the area of the light shielding layer 23 is increased as in the example of FIG. 15(c), a panel transmittance that is similar to the conventional level or even above can be obtained.

Note that the aforementioned effect will be outstanding in display modes of wide viewing angles (e.g., lateral electric field modes, such as the IPS mode and the FFS mode), where a high display quality is expected even under viewing from an oblique direction.

Moreover, increasing the area of the light shielding layer 23 will also result in an increased tolerance for misalignments in attaching the TFT substrate 10 and the color filter substrate 20 together, whereby an effect of improving the production yield will also result.

(Specific Example of Pixel Structure)

Various display modes can be used as the display mode of the liquid crystal display device 100 according to an embodiment of the present invention. Now, a specific pixel structure will be illustrated by taking the FFS mode, which is a kind of lateral electric field mode, as an example.

Figure 16:
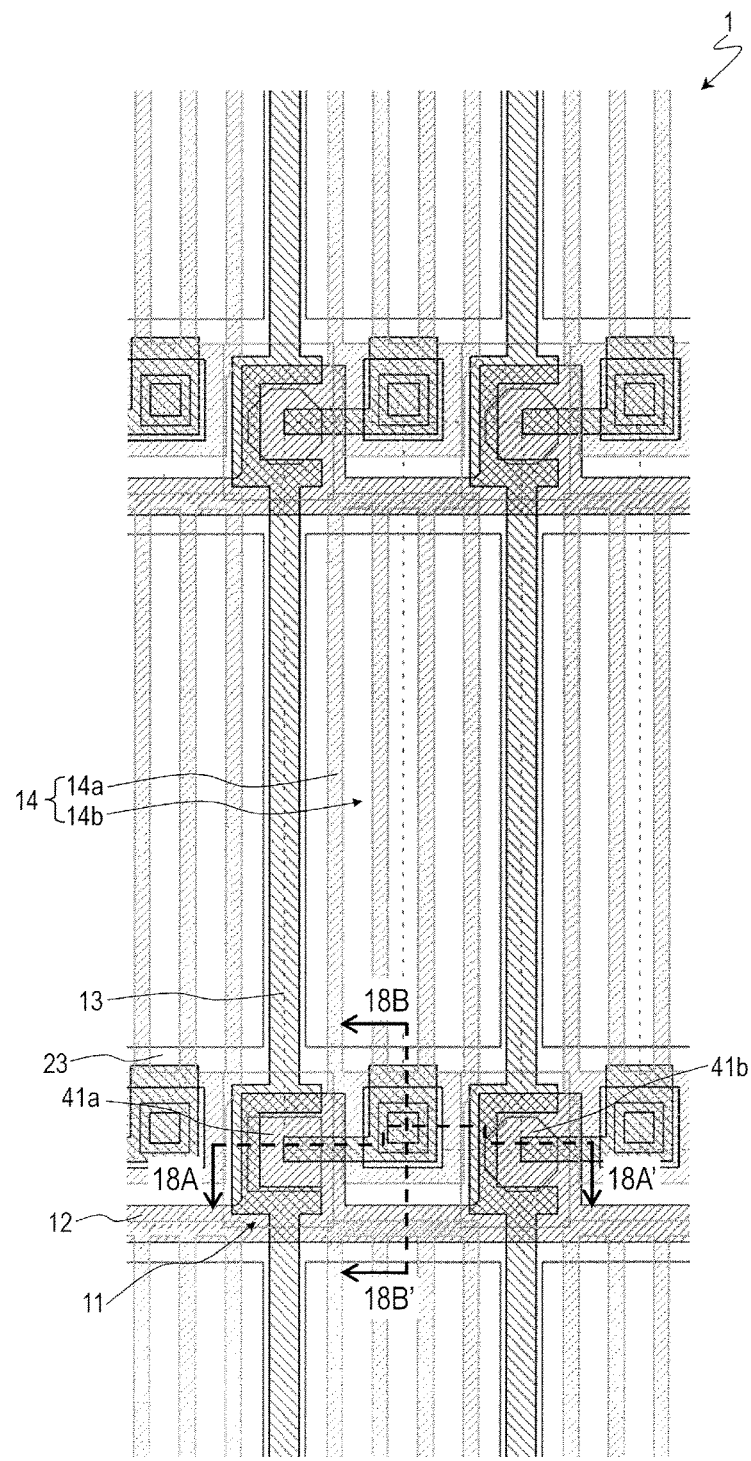
FIG. 16 A plan view schematically showing a liquid crystal display panel 1 of a liquid crystal display device 100 of the FFS mode.
Figure 17:
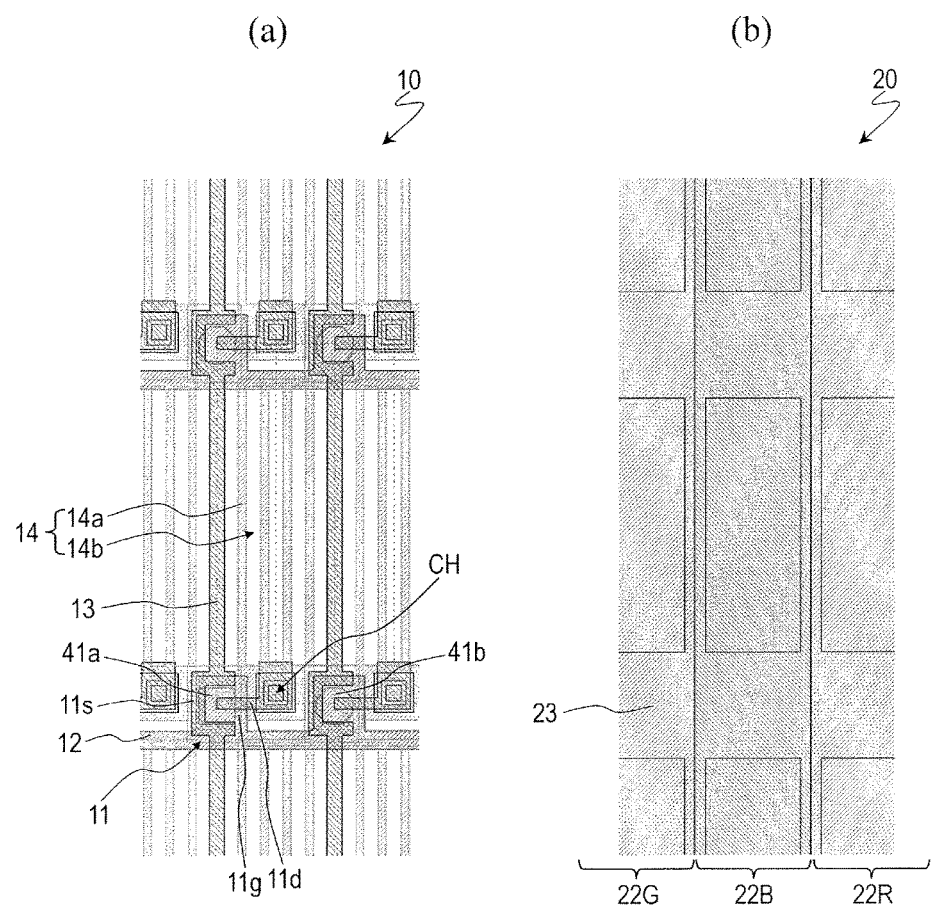
FIGS. 17 (a) and (b) are plan views schematically showing a TFT substrate 10 and a color filter substrate 20 of a liquid crystal display device 100 of the FFS mode, respectively.
Figure 18:
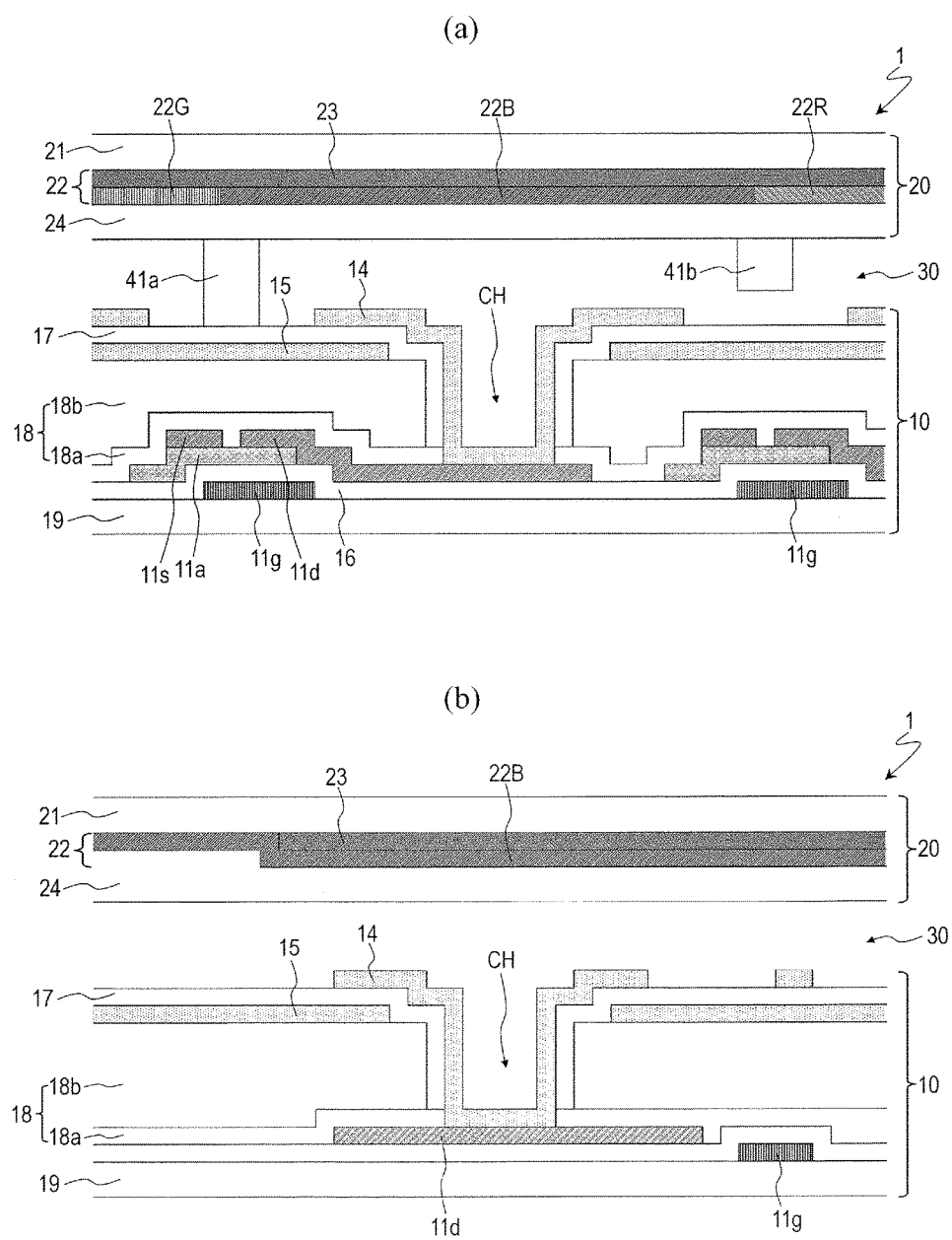
FIG. 18 (a) is a cross-sectional view taken along line 18A-18A' in FIG. 16, and (b) is a cross-sectional view taken along line 18B-18B' in FIG. 16.

FIG. 16 to FIG. 18 show a pixel structure of a liquid crystal display device 100 of the FFS mode. FIG. 16 is a plan view schematically showing the liquid crystal display panel 1. FIGS. 17(a) and (b) are plan views schematically showing the TFT substrate 10 and the color filter substrate 20, respectively. FIGS. 18(a) and (b) are cross-sectional views taken along line 18A-18A' and line 18B-18B' in FIG. 16, respectively.

The TFT substrate 10 includes a TFT 11 provided for each pixel, a scanning line 12 for supplying a scanning signal to the TFT 11, and a signal line 13 for supplying a display signal to the TFT 11. The TFT substrate 10 further includes pixel electrodes 14 which are electrically connected to the TFTs 11, and a common electrode 15 to which a common voltage is supplied.

Each TFT 11 includes a gate electrode 11g, a gate insulating layer (e.g., an SiNx layer) 16, a semiconductor layer 11a, a source electrode 11s, and a drain electrode 11d. The gate electrode 11g is electrically connected to the scanning line 12. Moreover, the source electrode 11s is electrically connected to the signal line 13, and the drain electrode 11d is electrically connected to the pixel electrode 14.

As the material of the semiconductor layer 11a of the TFT 11, various known semiconductor materials can be used, e.g., amorphous silicon, polycrystalline silicon, and continuous grain silicon (CGS). Moreover, oxide semiconductors such as In—Ga—Zn—O-type semiconductors may be used.

The scanning lines 12 extend substantially in parallel to the row direction. On the other hand, the signal lines 13 extend substantially in parallel to the column direction.

Each pixel electrode 14 includes a plurality of electrode strip portions 14a, and a plurality of slits 14b. The number of electrode strip portions 14a and the number of slits 14b are not limited to what is illustrated in FIG. 16 and the like. The pixel electrodes 14 are made of a transparent electrically conductive material (e.g., ITO or IZO).

The common electrode 15 is provided below the pixel electrodes 14 so as to overlap the pixel electrodes 14 via a dielectric layer (e.g., an SiNx layer) 17. The common electrode 15 is made of a transparent electrically conductive material (e.g., ITO or IZO).

An interlevel dielectric layer 18 is formed so as to cover the TFTs 11 and the signal lines 13, such that the common electrode 15 is formed on the interlevel dielectric layer 18. In the illustrated construction, the interlevel dielectric layer 18 is composed of an inorganic insulating layer (e.g., an SiNx layer) 18a and an organic insulating layer (made of e.g., a photo-sensitive resin) 18b.

The interlevel dielectric layer 18 has contact holes CH formed therein. In each contact hole CH, a pixel electrode 14 is connected to the drain electrode 11d of the TFT 11. The aforementioned component elements of the TFT substrate 10 are supported on a transparent substrate (e.g., a glass substrate) 19 which is electrically insulative.

The color filter substrate 20 includes a color filter layer 22 (red color filters 22R, green color filters 22G, and blue color filters 22B) and a light shielding layer (black matrix) 23. The red color filters 22R, green color filters 22G, and blue color filters 22B are provided in, respectively, regions corresponding to the red pixels, regions corresponding to the green pixels, and regions corresponding to the blue pixel regions. The light shielding layer 23 is shaped in a grating form so as to exist in between adjacent pixels.

A planarization layer 24 is provided on the color filter layer 22. On the planarization layer 24, a plurality of columnar spacers 41 that define the thickness (cell gap) of the liquid crystal layer 30 are provided. The plurality of columnar spacers 41 include main spacers 41a which are relatively tall and sub-spacers 41b which are relatively short. The aforementioned component elements of the color filter substrate 20 are supported on a transparent substrate (e.g., a glass substrate) 21 which is electrically insulative.

On the surface of each of the TFT substrate 10 and the color filter substrate 20 that faces the liquid crystal layer 30, a horizontal alignment film (not shown) is provided.

In the FFS-mode liquid crystal display device 100 having the aforementioned construction, a lateral electric field (oblique electric field) is generated by using a pixel electrode 14 and the common electrode 15, and this lateral electric field causes liquid crystal molecules to rotate within the substrate plane, whereby displaying is performed.

(Specific Example of Illuminator Construction)

Figure 19:
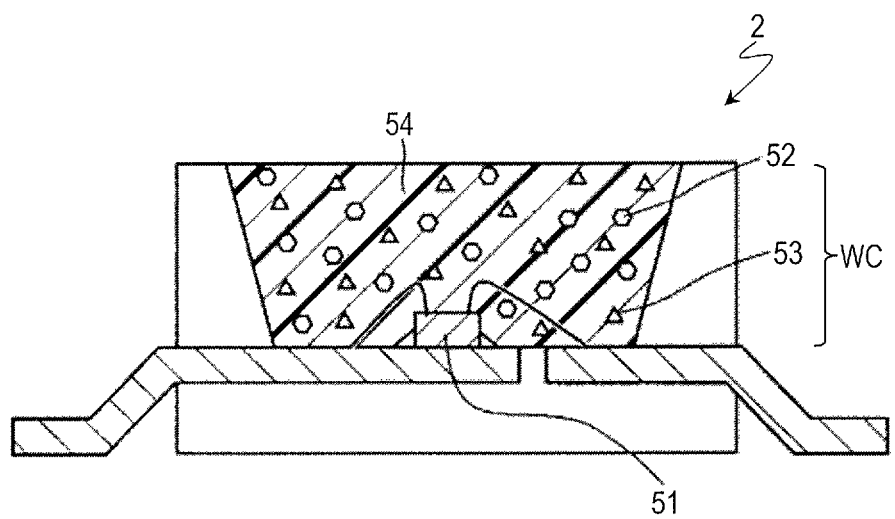
FIG. 19 A cross-sectional view schematically showing an illuminator 2.

As the illuminator 2 to emit light of the spectrum as shown in FIG. 2, FIG. 4, and FIG. 8, for example, a backlight which is disclosed in International Publication No. 2009/110285 can be used. The entire disclosure of International Publication No. 2009/110285 is incorporated herein by reference. Hereinafter, with reference to FIG. 19, an exemplary specific construction for the illuminator 2 will be described. FIG. 19 is a cross-sectional view schematically showing the illuminator 2.

As shown in FIG. 19, the illuminator 2 includes a light-emitting element 51 which emits excitation light, a green phosphor 52 which absorbs the excitation light emanating from the light-emitting element 51 to emit green light, and a red phosphor 53 which absorbs the excitation light emanating from the light-emitting element 51 to emit red light. The green phosphor 52 and the red phosphor 53 are contained within the sealant 54, and function as a wavelength converting portion WC which absorbs portions of the light emitted from the light-emitting element 2 to emit light of longer wavelengths.

Preferably, the wavelength converting portion WC contains: as the green phosphor 52, at least one selected from among (A) divalent europium-activated oxynitride phosphors which are β-type SiAlONs below and (B) divalent europium-activated silicate salt phosphors below; and as the red phosphor 53, at least one selected from among two kinds (C), (D) of tetravalent manganese-activated tetravalent metal fluoride salt phosphors below.

(A) Divalent Europium-Activated Oxynitride Green Phosphors which are β-Type SiAlONs A divalent europium-activated oxynitride green phosphor to be suitably used as the green phosphor 52 is essentially expressed by

  General Formula (A)

(hereinafter, this divalent europium-activated oxynitride green phosphor is referred to as the "first green phosphor"). In General Formula (A), Eu is europium, Si is silicon, Al is aluminum, O is oxygen, and N is nitrogen.

In General Formula (A), the value of a representing the mole fraction (concentration) of Eu is such that $0.005 \leq a \leq 0.4$. If the value of a is less than 0.005, adequate brightness may not be obtained. Moreover, if the value of a exceeds 0.4, brightness may be greatly degraded due to concentration quenching or the like. In terms of stability of the powder characteristics and homogeneity of the matrix, preferably the value of a in the above formula is such that $0.01 \leq a \leq 0.2$.

In General Formula (A), b representing the mole fraction (concentration) of Si and c representing the mole fraction (concentration) of Al are numbers satisfying b+c=12; and d representing the mole fraction (concentration) of O and e representing the mole fraction (concentration) of N are numbers satisfying d+e=16.

Specific examples of the first green phosphor include
$Eu_{0.05}Si_{11.50}Al_{0.50}O_{0.05}N_{15.95}$,
$Eu_{0.10}Si_{11.00}Al_{1.00}O_{0.10}N_{15.90}$,
$Eu_{0.30}Si_{9.80}Al_{2.20}O_{0.30}N_{15.70}$,
$Eu_{0.15}Si_{10.00}Al_{2.00}O_{0.20}N_{15.80}$,
$Eu_{0.01}Si_{11.60}Al_{0.40}O_{0.01}N_{15.99}$, and
$Eu_{0.005}Si_{11.70}Al_{0.30}O_{0.03}N_{15.97}$, but of course these are not exhaustive.

(B) Divalent Europium-Activated Silicate Salt Phosphor

The divalent europium-activated silicate salt phosphor to be suitably used as the green phosphor 52 is essentially expressed by

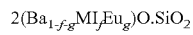  General Formula (B)

(hereinafter, this divalent europium-activated silicate salt phosphor is referred to as the "second green phosphor"). In General Formula (B), Ba is barium, Eu is europium, O is oxygen, and Si is silicon. In General Formula (B), MI represents at least one alkaline-earth metal element from among Mg, Ca, and Sr; in order to obtain a highly efficient matrix, MI is preferably Sr.

In General Formula (B), the value of f representing the mole fraction (concentration) of MI is such that $0 \leq f \leq 0.55$; when the value of f is in this range, green-based emission in a range from 510 to 540 nm will be obtained. If the value of f exceeds 0.55, the green-based emission may appear yellowish, thus resulting in poor color purity. Furthermore, from efficiency and color purity standpoints, preferably the value of f is in the range of $0.15 \leq f \leq 0.45$.

In General Formula (B), the value of g representing the mole fraction (concentration) of Eu is $0.03 \leq g \leq 0.10$. If the value of g is less than 0.03, adequate brightness may not be obtained. If the value of g exceeds 0.10, brightness may be greatly degraded due to concentration quenching or the like. In terms of brightness and stability of powder characteristics, preferably the value of g is in the range of $0.04 \leq g \leq 0.08$.

Specific examples of the second green phosphor include
$2(Ba_{0.70}Sr_{0.26}Eu_{0.04}).SiO_2$,  $2(Ba_{0.57}Sr_{0.38}Eu_{0.05})O.SiO_2$,
$2(Ba_{0.53}Sr_{0.43}Eu_{0.04})O.SiO_2$,  $2(Ba_{0.82}Sr_{0.15}Eu_{0.03})O.SiO_2$,
$2(Ba_{0.46}Sr_{0.49}Eu_{0.05})O.SiO_2$,  $2(Ba_{0.59}Sr_{0.35}Eu_{0.06})O.SiO_2$,
$2(Ba_{0.52}Sr_{0.40}Eu_{0.08})O.SiO_2$,  $2(Ba_{0.85}Sr_{0.10}Eu_{0.05})O.SiO_2$,
$2(Ba_{0.47}Sr_{0.50}Eu_{0.03})O.SiO_2$,  $2(Ba_{0.54}Sr_{0.36}Eu_{0.10})O.SiO_2$,
$2(Ba_{0.69}Sr_{0.25}Ca_{0.02}Eu_{0.04})O.SiO_2$, $2(Ba_{0.56}Sr_{0.38}Mg_{0.01}Eu_{0.05})O\cdot SiO_2$, and $2(Ba_{0.81}Sr_{0.13}Mg_{0.01}Ca_{0.01}Eu_{0.04})O\cdot SiO_2$, but of course these are not exhaustive.

(C) Tetravalent Manganese-Activated Tetravalent Metal Fluoride Salt Phosphor

The tetravalent manganese-activated tetravalent metal fluoride salt phosphor to be suitably used as the red phosphor 53 is essentially expressed by $$MII_2(MIII_{1-h}Mn_h)F_6 \qquad \text{General Formula (C):}$$

(hereinafter, this tetravalent manganese-activated tetravalent metal fluoride salt phosphor is referred to as the "first red phosphor"). In General Formula (C), Mn is manganese, and F is fluorine. In General Formula (C), MII represents at least one alkali metal element selected from among Na, K, Rb, and Cs; in terms of brightness and stability of powder characteristics, MII is preferably K. In General Formula (C), MIII represents at least one tetravalent metal element selected from among Ge, Si, Sn, Ti, and Zr; in terms of brightness and stability of powder characteristics, MIII is preferably Ti.

In General Formula (C), the value of h representing the mole fraction (concentration) of Mn is such that $0.001 \leq h \leq 0.1$. If the value of h is less than 0.001, adequate brightness may not be obtained. If the value of h exceeds 0.1, brightness may be greatly degraded due to concentration quenching or the like. In terms of brightness and stability of powder characteristics, the value of h is preferably such that $0.005 \leq h \leq 0.5$.

Specific examples of the first red phosphor include $K_2(Ti_{0.99}Mn_{0.01})F_6$, $K_2(Ti_{0.9}Mn_{0.1})F_6$, $K_2(Ti_{0.999}Mn_{0.001})F_6$, $Na_2(Zr_{0.98}Mn_{0.02})F_6$, $Cs_2(Si_{0.95}Mn_{0.05})F_6$, $Cs_2(Sn_{0.98}Mn_{0.02})F_6$, $K_2(Ti_{0.88}Zr_{0.10}Mn_{0.02})F_6$, $Na_2(Ti_{0.75}Sn_{0.20}Mn_{0.05})F_6$, $Cs_2(Ge_{0.999}Mn_{0.001})F_6$, and $(K_{0.80}Na_{0.20})_2(Ti_{0.69}Ge_{0.30}Mn_{0.01})F_6$, but of course these are not exhaustive.

(D) Tetravalent Manganese-Activated Tetravalent Metal Fluoride Salt Phosphor

The tetravalent manganese-activated tetravalent metal fluoride salt phosphor to be suitably used as the red phosphor 53 is essentially expressed by $$MIV(MIII_{1-h}Mn_h)F_6 \qquad \text{General Formula (D):}$$

(hereinafter, this tetravalent manganese-activated tetravalent metal fluoride salt phosphor is referred to as the "second red phosphor"). In General Formula (D), Mn is manganese, and F is fluorine. In General Formula (D), similarly to MIII in General Formula (C) mentioned above, MIII represents at least one tetravalent metal element selected from among Ge, Si, Sn, Ti, and Zr; for similar reasons, MIII is preferably Ti. In General Formula (D), MIV represents at least one alkaline-earth metal element selected from among Mg, Ca, Sr, Ba, and Zn; in terms of brightness and stability of powder characteristics, MIV is preferably Ca.

In General Formula (D), similarly to h in General Formula (C) mentioned above, the value of h representing the mole fraction (concentration) of Mn is such that $0.001 \leq h \leq 0.1$; for similar reasons, it is preferable that $0.005 \leq h \leq 0.5$.

Specific examples of the second red phosphor include $Zn(Ti_{0.98}Mn_{0.02})F_6$, $Ba(Zr_{0.995}Mn_{0.005})F_6$, $Ca(Ti_{0.995}Mn_{0.005})F_6$, and $Sr(Zr_{0.98}Mn_{0.02})F_6$, but of course these are not exhaustive.

Although there is no particular limitation as to the mixing ratio between the green phosphor 52 and the red phosphor 53, the green phosphor 52 is preferably mixed by a mixing ratio in the range of 5% to 70%, in a weight ratio based on the red phosphor 53; more preferably, it is mixed by a mixing ratio in the range from 15% to 45%.

As the light-emitting element 2, a gallium nitride (GaN)-type semiconductor light-emitting element which emits blue light with a peak wavelength of not less than 430 nm and not more than 480 nm (more preferably not less than 440 nm and not more than 480 nm) can be suitably used. If a light-emitting element with a peak wavelength less than 430 nm is used, the blue light component may have less contribution, thus resulting in poor color rendition. If a light-emitting element with a peak wavelength over 480 nm, the white brightness may be degraded.

As the sealant 6, epoxy resins, silicone resins, urea resins, or the like which are light-transmissive resin materials may be used, but these are not exhaustive. Moreover, the wavelength converting portion WC may contain additives such as $SiO_2$, $TiO_2$, $ZrO_2$, $Al_2O_3$, and $Y_2O_3$ as necessary, in addition to the aforementioned green phosphor 52, red phosphor 53, and sealant 54.

Note that the green phosphor 52 and the red phosphor 53 are not limited to those mentioned above. For example, green phosphors which are disclosed in Japanese Laid-Open Patent Publication No. 2008-303331 and red phosphors which are disclosed in Japanese Laid-Open Patent Publication No. 2010-93132 may also be used. The entire disclosure of Japanese Laid-Open Patent Publication No. 2008-303331 and Japanese Laid-Open Patent Publication No. 2010-93132 is incorporated herein by reference.

INDUSTRIAL APPLICABILITY

According to an embodiment of the present invention, there is provided a liquid crystal display device which has good color rendition and is able to achieve high panel transmittance.

REFERENCE SIGNS LIST 1 liquid crystal display panel
2 illuminator
10 active matrix substrate (TFT substrate)
20 color filter substrate (counter substrate)
22 color filter layer
22R red color filter
22G green color filter
22B blue color filter
23 light shielding layer (black matrix)
24 planarization layer
51 light-emitting element
52 green phosphor
53 red phosphor
100 liquid crystal display device

The invention claimed is:
1. A liquid crystal display device comprising:
a liquid crystal display panel including a red color filter, a green color filter, and a blue color filter; and
an illuminator that irradiates the liquid crystal display panel with light, wherein,
a spectrum of the light which is emitted by the illuminator has a peak in each of wavelength ranges of not less than 447 nm and not more than 453 nm; not less than 528 nm and not more than 532 nm; not less than 613 nm and not more than 617 nm; not less than 628 nm and not more than 632 nm; and not less than 648 nm and not more than 652 nm;

a peak wavelength and a rising wavelength of a transmission spectrum of the red color filter are, respectively, not less than 600 nm; and not less than 568 nm and not more than 572 nm;

at wavelengths of 400 nm, 420 nm and 580 nm, the transmission spectrum of the red color filter exhibits transmittances of, respectively, not less than 10% and not more than 15%; not less than 3% and not more than 6%; and not less than 25% and not more than 30%;

wavelengths at which the transmission spectrum of the red color filter exhibits a transmittance of 50% are contained within a range of not less than 583 nm and not more than 587 nm;

a peak wavelength of a transmission spectrum of the green color filter is not less than 520 nm and not more than 540 nm;

at wavelengths of 480 nm and 560 nm, the transmission spectrum of the green color filter exhibits transmittances of, respectively, not less than 15% and not more than 20%; and not less than 20% and not more than 30%;

wavelengths at which the transmission spectrum of the green color filter exhibits a transmittance of 50% are contained within a range of not less than 498 nm and not more than 502 nm and a range of not less than 540 nm and not more than 550 nm;

a peak wavelength of a transmission spectrum of the blue color filter is not less than 465 nm and not more than 475 nm; and the transmission spectrum of the blue color filter exhibits a transmittance of not less than 20% and not more than 25% at each of wavelengths 400 nm and 500 nm, and exhibits a transmittance of 40% or less at the peak wavelength.

2. The liquid crystal display device of claim 1, wherein each of the red color filter, the green color filter, and the blue color filter has a thickness of 1.5 µm or less.

3. The liquid crystal display device of claim 1, wherein,
the liquid crystal display panel includes a color filter substrate, the color filter substrate including the red color filter, the green color filter, and the blue color filter; and
the color filter substrate further includes a planarization layer formed so as to cover the red color filter, the green color filter, and the blue color filter.

4. The liquid crystal display device of claim 1, performing displaying in a lateral electric field mode.

5. The liquid crystal display device of claim 1, wherein the illuminator includes a light-emitting element to emit excitation light, a green phosphor to emit green light by absorbing the excitation light emitted from the light-emitting element, and a red phosphor to emit red light by absorbing the excitation light emitted from the light-emitting element.

* * * * *